United States Patent
Hara et al.

(10) Patent No.: US 12,187,342 B2
(45) Date of Patent: Jan. 7, 2025

(54) VEHICLE FRONT SECTION STRUCTURE

(71) Applicant: TOYOTA JIDOSHA KABUSHIKI KAISHA, Toyota (JP)

(72) Inventors: Yasuhiro Hara, Nagoya (JP); Norimasa Koreishi, Miyoshi (JP); Jumpei Watanabe, Nagakute (JP); Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 17/843,553

(22) Filed: Jun. 17, 2022

(65) Prior Publication Data

US 2022/0402551 A1    Dec. 22, 2022

(30) Foreign Application Priority Data

Jun. 22, 2021   (JP) ................................ 2021-103558

(51) Int. Cl.
*B62D 21/15*     (2006.01)
*B60K 1/04*      (2019.01)
(Continued)

(52) U.S. Cl.
CPC .............. *B62D 21/152* (2013.01); *B60K 1/04* (2013.01); *B62D 25/08* (2013.01); *B62D 25/20* (2013.01); *B60K 2001/0411* (2013.01)

(58) Field of Classification Search
CPC .... B62D 21/152; B62D 21/155; B62D 21/02; B62D 21/03; B62D 21/07; B62D 25/08;
(Continued)

(56) References Cited

U.S. PATENT DOCUMENTS

2013/0341969 A1* 12/2013 Fujii .................. B62D 25/2018
                                                     296/193.07
2016/0083011 A1*  3/2016 Kawaguchi .......... B62D 25/087
                                                     296/203.01
(Continued)

FOREIGN PATENT DOCUMENTS

DE    102010009611 A1 *  8/2011 ............. B62D 21/02
JP    2002-308151 A     10/2002
(Continued)

OTHER PUBLICATIONS

Maier, Recreational Vehicle Has Assembly Part Arranged in Area of Driver Cell . . . , Aug. 11, 2011, EPO, DE 102010009611 A1, Machine Translation of Description (Year: 2011).*

*Primary Examiner* — Paul N Dickson
*Assistant Examiner* — Matthew D Lee
(74) *Attorney, Agent, or Firm* — Dinsmore & Shohl LLP

(57) ABSTRACT

A vehicle front section structure includes: a power unit installed at a front section; a left and right pair of front side frames extending in a vehicle front-rear direction; a left and right pair of front side members extending in the vehicle front-rear direction at a vehicle upper side of the left and right pair of front side frames, with rear end portions of the front side members being respectively joined to the left and right pair of front side frames; a cross member disposed at a vehicle rear side and obliquely upward of the power unit so as to span between the left and right pair of front side members and to support a driving seat of the vehicle; and a reinforcement brace spanning between the cross member and at least one front side member of the left front side member or a right front side member.

9 Claims, 3 Drawing Sheets

(51) Int. Cl.
*B62D 25/08* (2006.01)
*B62D 25/20* (2006.01)

(58) Field of Classification Search
CPC ... B62D 25/20; B60K 1/04; B60K 2001/0411
See application file for complete search history.

(56) References Cited

U.S. PATENT DOCUMENTS

| | | | |
|---|---|---|---|
| 2017/0291643 A1* | 10/2017 | Sakamoto | B60L 50/51 |
| 2020/0101879 A1* | 4/2020 | Sakai | B60N 2/502 |
| 2021/0024131 A1 | 1/2021 | Baccouche et al. | |
| 2021/0245815 A1* | 8/2021 | Watanabe | B62D 25/2027 |
| 2024/0109588 A1* | 4/2024 | Nagasawa | B62D 21/155 |
| 2024/0109592 A1* | 4/2024 | Nagasawa | B62D 21/11 |

FOREIGN PATENT DOCUMENTS

| | | | |
|---|---|---|---|
| JP | 2015116960 A | 6/2015 | |
| JP | 2017-185913 A | 10/2017 | |
| JP | 6795109 B1 | 12/2020 | |

\* cited by examiner

VEHICLE FRONT SECTION STRUCTURE

CROSS-REFERENCE TO RELATED APPLICATION

This application is based on and claims priority under 35 USC 119 from Japanese Patent Application No. 2021-103558 filed on Jun. 22, 2021, the disclosures of which are incorporated by reference herein.

BACKGROUND

Technical Field

The present disclosure relates to a vehicle front section structure.

Related Art

Japanese Patent Application Laid-Open (JP-A) No. 2002-308151 discloses technology relating to a cab-over vehicle in which a cabin is fixed to a chassis frame.

In this related art, a front cross member is provided along a vehicle width direction at a front end portion of cab flooring, and a step is provided along the vehicle width direction at a vehicle front-rear direction intermediate portion of the cab flooring, such that a rear floor section is formed higher than a front floor section of the cab flooring. A driving seat is provided at the rear floor section, and an engine is provided at a lower side of the rear floor section.

In this related art, in cases in which load toward the vehicle rear side is applied in a head-on collision of the vehicle (hereafter referred to as a vehicle head-on collision) and the front cross member deforms, load might be input to a power unit, causing damage to the power unit.

SUMMARY

In consideration of the above circumstances, the present disclosure obtains a vehicle front section structure capable of reducing load input to a power unit in a vehicle head-on collision and thereby suppressing damage to the power unit.

Solution to Problem

A vehicle front section structure according to a first aspect of the present disclosure includes: a power unit installed at a front section of a vehicle; a left and right pair of front side frames extending in a vehicle front-rear direction at both vehicle width direction sides of the power unit so as support the power unit; a left and right pair of front side members extending in the vehicle front-rear direction at a vehicle upper side of the left and right pair of front side frames, with rear end portions of the front side members being respectively joined to the left and right pair of front side frames; a cross member disposed at a vehicle rear side and obliquely upward of the power unit so as to span, in a vehicle width direction, between the left and right pair of front side members and to support a driving seat of the vehicle; and a reinforcement brace spanning between the cross member and at least one front side member of a left front side member or a right front side member.

In the vehicle front section structure according to the first aspect, the power unit is installed at the vehicle front section, the left and right pair of front side frames extend in the vehicle front-rear direction at both vehicle width direction sides of the power unit, and the power unit is supported by the left and right pair of front side frames.

The left and right pair of front side members extend in the vehicle front-rear direction at the vehicle upper side of the left and right pair of front side frames, and the rear end portions of the left and right pair of front side members are respectively joined to the left and right pair of front side frames.

The cross member is provided at the vehicle rear side and obliquely upward of the power unit. The cross member spans, in a vehicle width direction, between the left and right pair of front side members. The driving seat of the vehicle is supported by the cross member.

Note that the reinforcement brace spans in the form of bracing between the cross member and at least one front side member out of the left front side member or the right front side member. The corresponding front side member and the cross member are reinforced due to the reinforcement brace spanning between this front side member and the cross member in this manner.

Thus, in the present disclosure, in cases in which load toward a vehicle front side is input to the driving seat due to inertia in a vehicle head-on collision, deformation of the cross member that supports the driving seat can be suppressed. In the present disclosure, the cross member is provided at the vehicle rear side and obliquely upward of the power unit, and so by suppressing deformation of the cross member, interference between the cross member and the power unit that would occur as a result of deformation of the cross member can be suppressed.

A vehicle front section structure according to a second aspect is the vehicle front section structure according to the first aspect, wherein the power unit includes a motor supported by the left and right pair of front side frames and enabling the vehicle to travel, and a drive unit disposed at a vehicle upper side of the motor and controlling driving of the motor.

In the vehicle front section structure according to the second aspect, the power unit is configured including the motor and the drive unit. The motor is supported by the left and right pair of front side frames, and the motor enables the vehicle to travel. The drive unit is disposed at the vehicle upper side of the motor, and driving of the motor is controlled by the drive unit.

A vehicle front section structure according to a third aspect is the vehicle front section structure according to the first aspect or the second aspect, wherein the driving seat is disposed offset toward one vehicle width direction side with respect to a vehicle width direction center of the vehicle. The reinforcement brace is disposed at least at the one vehicle width direction side, and a joint between the reinforcement brace and the cross member overlaps with the driving seat in a vehicle front view.

In the vehicle front section structure according to the third aspect, the driving seat is disposed offset toward one vehicle width direction side with respect to the vehicle width direction center of the vehicle. The reinforcement brace is disposed at least at the one vehicle width direction side, and the joint between the reinforcement brace and the cross member overlaps with the driving seat in a vehicle front view.

Since the driving seat is disposed offset toward the one vehicle width direction side with respect to the vehicle width direction center of the vehicle, in cases in which load toward the vehicle front side is input to the driving seat due to inertia in a vehicle head-on collision, deformation of the cross member that supports the driving seat can be better suppressed than in configurations in which the driving seat is disposed at the vehicle width direction center of the vehicle.

Moreover, in the present disclosure, the joint between the reinforcement brace and the cross member overlaps with the driving seat in a vehicle face-on view. Thus, in cases in which load toward the vehicle rear side is applied to the front side member in a vehicle head-on collision, load toward the vehicle rear side acts on the driving seat side through the joint. Thus, in the present disclosure, some of the load toward the vehicle front side that acts on the driving seat due to inertia in a vehicle head-on collision can be cancelled out. This enables load toward the vehicle front side acting on the driving seat to be reduced.

A vehicle front section structure according to a fourth aspect is the vehicle front section structure according to the first aspect or the second aspect, wherein a left and right pair of reinforcement braces respectively span between the left and right pair of front side members and the cross member. Respective joints between the left and right pair of reinforcement braces and the cross member overlap with the driving seat in a vehicle front view.

In the vehicle front section structure according to the fourth aspect, the left and right pair of reinforcement braces respectively span between the left and right pair of front side members and the cross member. Thus, the front side members and the cross member are better reinforced than in configurations in which the reinforcement brace only spans between one of the front side members and the cross member. Thus, even if load toward the vehicle front side is input to the driving seat due to inertia in a vehicle head-on collision, deformation of the cross member can be further suppressed.

Note that in the present disclosure, since the respective joints between the left and right pair of reinforcement braces and the cross member overlap with the driving seat in a vehicle front view, load toward the vehicle rear side acts on the driving seat through these joints in cases in which load toward the vehicle rear side is applied to the front side members in a vehicle head-on collision.

Thus, in the present disclosure, load toward the vehicle rear side acting on the driving seat is greater than in configurations in which only the joint between the one of the reinforcement braces and the cross member overlaps with the driving seat in a vehicle front view. This enables some of the load toward the vehicle front side acting on the driving seat in a vehicle head-on collision to be even more effectively cancelled out, enabling the load toward the vehicle front side acting on the driving seat due to inertia to be further reduced.

A vehicle front section structure according to a fifth aspect is the vehicle front section structure according to any one of the first aspect to the fourth aspect, wherein the reinforcement brace overlaps with the power unit in the vehicle front-rear direction in a vehicle side view.

In the vehicle front section structure according to the fifth aspect, the reinforcement brace overlaps with the power unit in the vehicle front-rear direction in a vehicle side view, thereby enabling the power unit to be protected against shock from sides of the vehicle.

Effects

As described above, the vehicle front section structure of the first aspect enables load input to the power unit to be reduced and damage to the power unit to be suppressed in a vehicle head-on collision.

The vehicle front section structure of the second aspect enables at least load input to the drive unit to be reduced and damage to the drive unit to be suppressed in a vehicle head-on collision.

The vehicle front section structure of the third aspect enables load toward the vehicle front side acting on the driving seat to be reduced and load input to the power unit to be reduced in a vehicle head-on collision.

The vehicle front section structure of the fourth aspect enables load toward the vehicle front side acting on the driving seat to be further reduced and load input to the power unit to be further reduced in a vehicle head-on collision.

The vehicle front section structure of the fifth aspect enables load input to the power unit to be further reduced.

BRIEF DESCRIPTION OF THE DRAWINGS

Exemplary embodiments of the present disclosure will be described in detail based on the following figures, wherein.

DETAILED DESCRIPTION

Figure 1:
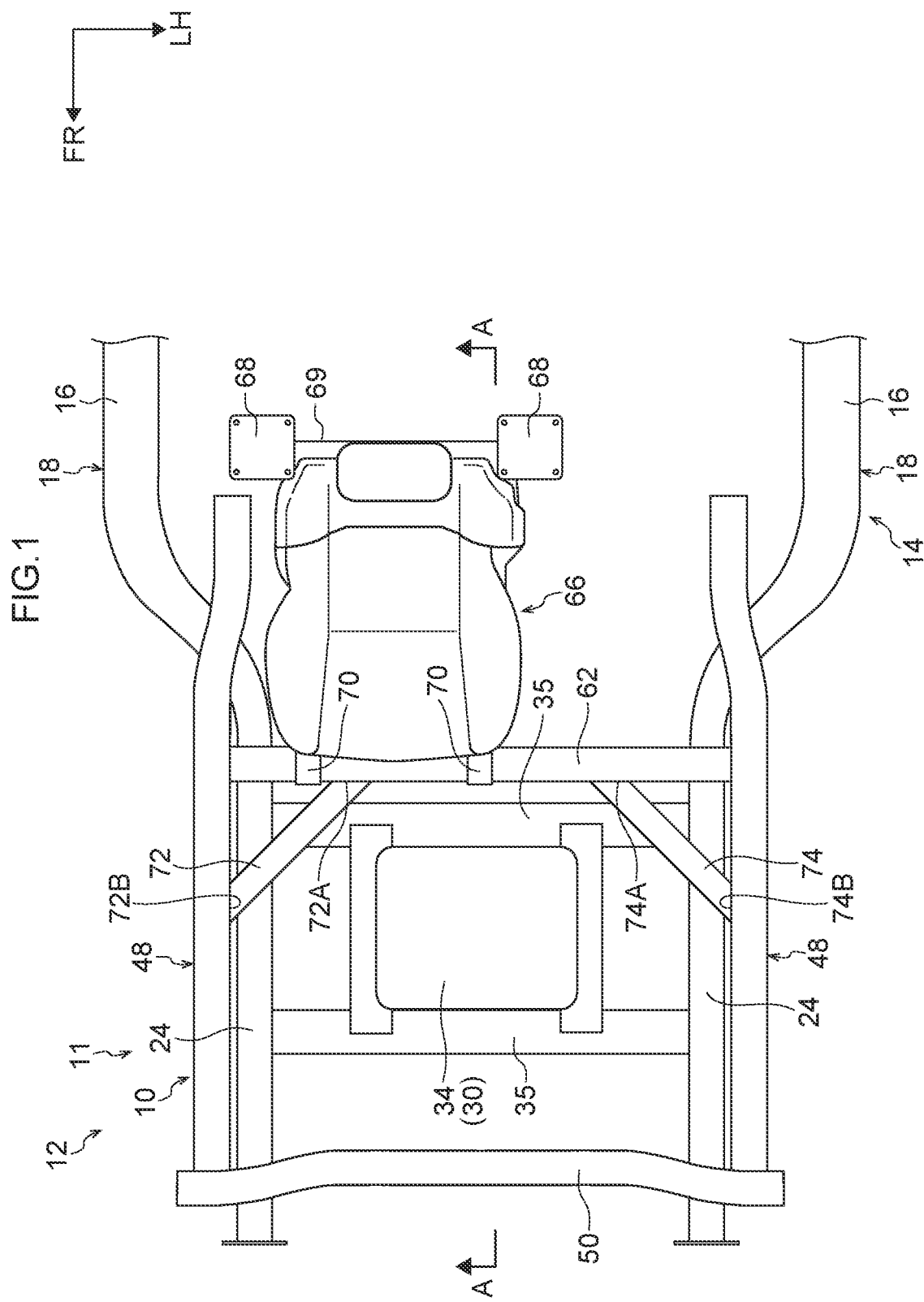
FIG. 1 is a plan view illustrating a front section of a vehicle applied with a vehicle front section structure according to an exemplary embodiment.

Explanation follows regarding a vehicle front section structure 10 according to an exemplary embodiment of the present disclosure, with reference to the drawings. Note that some of the reference numerals may be omitted from the drawings in order to facilitate viewing of the drawings. In the respective drawings, the arrow FR, the arrow LH, and the arrow UP respectively indicate a vehicle front side (direction of progress), a vehicle left side, and a vehicle upper side, as appropriate. Moreover, unless specifically stated otherwise, simple reference to front and rear, left and right, and up and down directions refers to front and rear in a vehicle front-rear direction, left and right in a vehicle left-right direction (vehicle width direction), and up and down in a vehicle vertical direction.

Configuration of Vehicle Front Section Structure

First, explanation follows regarding a configuration of the vehicle front section structure 10 according to the present exemplary embodiment.

Figure 2:
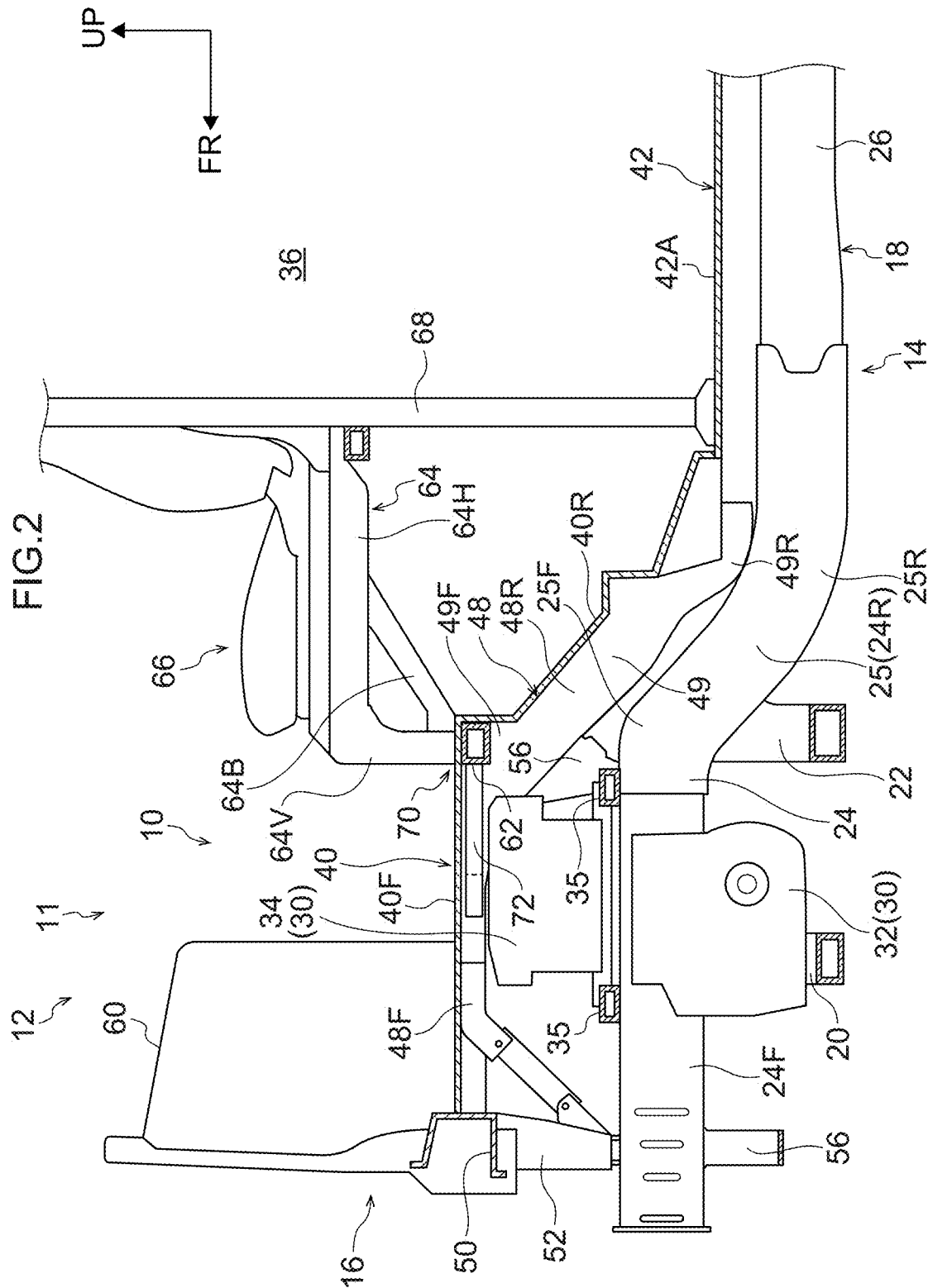
FIG. 2 is a cross-section sectioned along line A-A in FIG. 1.

As illustrated in FIG. 1 and FIG. 2, a vehicle 12 applied with the vehicle front section structure 10 according to the present exemplary embodiment is a vehicle with a frame structure in which a body 16 including a cabin is fixed to the upper side of a ladder frame 14. As an example, the vehicle 12 may be a vehicle used for ride sharing, such as a bus. Although not illustrated in the drawings, the body 16 of the vehicle 12 has a substantially rectangular block-shaped external profile. As an example, the vehicle 12 is an electric vehicle. First, explanation follows regarding an outline of a framework structure of the vehicle 12.

The ladder frame 14 includes left and right (a pair of) side frames 18 and plural cross members 20, 22. The left and right side frames 18 extend along the front-rear direction at both vehicle width direction side sections of the vehicle 12. The plural cross members 20, 22 each extend along the vehicle width direction so as to be arrayed in the front-rear direction with a spacing therebetween. The left and right side frames 18 are connected in the vehicle width direction by the plural cross members 20, 22.

The left and right side frames 18 are respectively configured by left and right front side frames 24, left and right center side frames 26, and left and right rear side frames (not illustrated in the drawings). The left and right front side frames 24 extend along the front-rear direction at front portions of both vehicle width direction side sections of the vehicle 12. The left and right center side frames 26 extend along the front-rear direction at front-rear direction central portions of both vehicle width direction side sections of the vehicle 12. The left and right rear side frames extend along the front-rear direction at rear portions of both vehicle width direction side sections of the vehicle 12.

The front side frames 24, the center side frames 26, and the rear side frames are each formed in an angular tube shape using a steel material or the like, and each have a rectangular closed cross-section as viewed along the front-rear direction. Note that plural non-illustrated cross members are also provided between the left and right center side frames 26, and between the left and right rear side frames.

A front section 24F of each of the left and right front side frames 24 extends in a straight line along the front-rear direction. Front-rear direction intermediate portions of the respective front sections 24F are connected in the vehicle width direction by the cross member 20. Although not illustrated in the drawings, a suspension tower is fixed to a vehicle width direction outer face of each of the front sections 24F.

A front side portion of a rear section 24R of each of the left and right front side frames 24 configures a kick panel 25 that slopes downward on progression toward the rear side. A rear side portion of the rear section 24R extends in a straight line along the front-rear direction. Each of the kick panels 25 is formed so as to bend in substantially a crank shape in a vehicle side-on view, such that bend portions 25F, 25R are provided at the vehicle front and rear of each of the kick panels 25. The bend portion 25F provided on the front side is bent so as to bulge toward the upper-rear side, whereas the bend portion 25R provided on the rear side is bent so as to bulge toward the lower-front side. Front portions of the respective kick panels 25 are connected in the vehicle width direction by the cross member 22. Front end portions of the left and right center side frames 26 are joined to rear end portions of the respective kick panels 25.

A motor 32 for causing the vehicle 12 to travel is disposed between the left and right front side frames 24. The motor 32 is supported by the left and right front side frames 24 through the cross members 20, 22 and a non-illustrated support member or the like. A control unit (drive unit) 34 that controls power supplied to the motor 32 is disposed above the motor 32. The control unit 34 is supported by the left and right front side frames 24 through a pair of support frames 35 disposed at the vehicle front and rear so to span between the left and right front side frames 24. The motor 32 and the control unit 34 configure a power unit 30.

The body 16 is supported from the lower side by the ladder frame 14 with the above configuration. The body 16 includes floor paneling 38 configuring floor sections of a vehicle cabin interior 36. The floor paneling 38 includes a front floor panel 40 configuring a floor section at a front section of the vehicle cabin interior 36, a central floor panel 42 configuring floor section at a front-rear direction intermediate section of the vehicle cabin interior 36, and a rear floor panel (not illustrated in the drawings) configuring a floor section at a rear section of the vehicle cabin interior 36. The front floor panel 40, the central floor panel 42, and the rear floor panel are each configured of sheet steel or the like.

A front section of the front floor panel 40 configures a driving seat floor section 40F extending along the front-rear direction and the vehicle width direction. A rear section of the front floor panel 40 configures a sloped section 40R that slopes downward on progression toward the vehicle rear side.

The driving seat floor section 40F is disposed spaced apart from and at the upper side of the front sections 24F of the left and right front side frames 24, and the sloped section 40R is disposed spaced apart from and at the upper side of the rear sections 24R of the left and right front side frames 24. Note that the above-mentioned control unit 34 is disposed below the driving seat floor section 40F.

A front end portion of the central floor panel 42 is joined to a rear end portion of the sloped section 40R. The central floor panel 42 extends along the front-rear direction and the vehicle width direction. A non-illustrated battery that stores power for supply to the above-mentioned motor 32 is disposed below the central floor panel 42. A step is provided between the driving seat floor section 40F and a general floor section (another floor section) 42A formed by the central floor panel 42, such that the driving seat floor section 40F is positioned further toward the upper side than the general floor section 42A.

The front floor panel 40 is supported by the left and right front side frames 24 through a left and right pair of front side members 48. The left and right front side members 48 extend along the front-rear direction at the upper side and vehicle width direction outside of the left and right front side frames 24. The left and right front side members 48 are each manufactured by for example pressing sheet steel, and are joined to a lower face of the front floor panel 40 by welding, such that a closed cross-section extending along the vehicle front-rear direction is formed between each of the left and right front side members 48 and the front floor panel 40.

A front section 48F of each of the left and right front side members 48 extends in a straight line along the front-rear direction, and is joined to a lower face of the driving seat floor section 40F of the front floor panel 40. A rear section 48R of each of the left and right front side members 48 is provided with a kick panel 49 that slopes downward on progression toward the rear side, and is joined to a lower face of the sloped section 40R of the front floor panel 40. Each of the kick panels 49 is formed so as to bend in substantially a crank shape in a vehicle side-on view, such that bend portions 49F, 49R are provided at the vehicle front and rear of each of the kick panels 49. The bend portion 49F provided on the front side is bent so as to bulge toward the upper-rear side, whereas the bend portion 49R provided on the rear side is bent so as to bulge toward the lower-front side.

A front cross member 50 that extends along the vehicle width direction is disposed at front end portions of the left and right front side members 48. The front cross member 50 is configured of sheet steel or the like, and has a hat-shaped cross-section open toward the front side as viewed along the vehicle width direction. A flange that for example overlays a rear face of the front cross member 50 is provided at the front end portion of each of the left and right front side members 48, and the flange is fixed to the rear face of the front cross member 50 by bolt-fastening. The front end portions of the left and right front side members 48 are thereby connected in the vehicle width direction by the front cross member 50.

Both vehicle width direction end portions of the front cross member 50 are supported by front end portions of the left and right front side frames 24 through front side pillar members 52 provided on the left and right. Each of the left and right front side pillar members 52 is for example formed by pressing sheet steel, and has a box shape open toward the front and upper sides. For example, a non-illustrated flange formed to an upper end portion of each of the front side pillar members 52 is fixed to the front cross member 50 by welding or bolt-fastening. A lower end portion of each of the front side pillar members 52 is fixed to the corresponding front side frame 24 through a non-illustrated bracket.

Front end portions of the respective kick panels 49 of the left and right front side members 48 are supported by the left and right front side frames 24 through rear side pillar members 56 provided on the left and right. Each of the left and right rear side pillar members 56 is for example formed by pressing sheet steel, and has a box shape open toward the vehicle width direction center side and the upper side. For example, a flange formed to an upper end portion of each of the rear side pillar members 56 is fixed to the front end portion of the corresponding kick panel 49 by welding or bolt-fastening. A lower end portion of each of the rear side pillar members 56 is fixed to the corresponding front side frame 24 through a non-illustrated bracket.

The left and right front side members 48 are supported from the lower side by the left and right front side frames 24 through the front cross member 50, the front side pillar members 52, the rear side pillar members 56, and so on. The front floor panel 40 is supported from the lower side by the left and right front side members 48. An instrument panel 60 is installed and fixed to an upper face of a front section of the front floor panel 40.

The front end portions of the respective kick panels 49 of the left and right front side members 48 are connected in the vehicle width direction by a seat cross member (cross member) 62. The seat cross member 62 is for example formed in an angular tube shape using a steel material, and extends along the vehicle width direction. Both vehicle width direction end portions of the seat cross member 62 are joined to the front end portions of the respective kick panels 49 by welding. A rear end portion of the driving seat floor section 40F is joined to an upper face of the seat cross member 62 by welding, and the seat cross member 62 supports a front end portion of a seat frame 64 from the lower side.

The seat frame 64 is a frame that supports a driving seat 66 provided on the right side of the vehicle 12 from the lower side. The seat frame 64 includes a left and right pair of vertical sections 64V extending along the vertical direction, and a horizontal section 64H extending rearward from upper end portions of the left and right vertical sections 64V. Brace portions 64B span in the form of bracing between lower end portions of the vertical sections 64V and a front-rear direction intermediate portion of the horizontal section 64H.

Fixing portions 70 are provided at the lower end portions of the vertical sections 64V. The lower end portions of the vertical sections 64V are fixed to the rear end portion of the driving seat floor section 40F and to the seat cross member 62 through the fixing portions 70 by bolt-fastening. A rear end portion of the horizontal section 64H is fixed to vertical direction intermediate portions of a left and right pair of support pillars 68 that project upward from the front end portion of the central floor panel 42. The left and right support pillars 68 are for example each formed in an angular tube shape using a steel material or the like, extend along the vertical direction, and are arrayed in the vehicle width direction with a spacing therebetween. An upright wall portion 69 spans across the vehicle width direction between the left and right support pillars 68. Although not illustrated in the drawings, plural passenger seats are provided at the rear side of the upright wall portion 69.

As described above, the kick panels 25, 49 that slope downward on progression toward the rear side are respectively provided to the rear sections 24R of the left and right front side frames 24 and to the rear sections 48R of the left and right front side members 48 disposed above the left and right front side frames 24. The kick panels 25, 49 are positioned at the rear side of the left and right pair of vertical sections 64V configuring the front end portion of the seat frame 64.

Note that in the present exemplary embodiment, reinforcement braces 72, 74 with substantially the same length as one another span in the form of bracing between the respective left and right front side members 48 and the seat cross member 62 (so as to form an angle of approximately 45° with the seat cross member 62) at the vehicle width direction inside of the left and right front side members 48. As mentioned above, the driving seat 66 is provided on the right side of the vehicle 12, and a joint 72A between the reinforcement brace 72 and the seat cross member 62 is disposed overlapping the driving seat 66 in a vehicle face-on view. A joint 72B between the reinforcement brace 72 and the corresponding front side member 48 is disposed overlapping the power unit 30 in the vehicle front-rear direction in a vehicle side-on view. Thus, the reinforcement brace 72 and the power unit 30 are disposed overlapping one another in a vehicle side-on view. A joint 74A between the reinforcement brace 74 and the seat cross member 62 is disposed further toward the left side than the vehicle width direction center. A joint 74B between the reinforcement brace 74 and the corresponding front side member 48 is disposed overlapping the power unit 30 in the vehicle front-rear direction in a vehicle side-on view. Thus, the reinforcement brace 74 and the power unit 30 are disposed overlapping one another in a vehicle side-on view.

Operation and Effects of Vehicle Front Section Structure

Next, explanation follows regarding operation and effects of the vehicle front section structure 10 according to the present exemplary embodiment.

As illustrated in FIG. 1 and FIG. 2, in the vehicle front section structure 10 of the present exemplary embodiment, the power unit 30 is installed to a vehicle front section 11, the left and right front side frames 24 extend along the vehicle front-rear direction on both vehicle width direction sides of the power unit 30, and the power unit 30 is supported by these left and right front side frames 24.

The left and right pair of front side members 48 extend along the vehicle front-rear direction at the vehicle upper sides of the left and right front side frames 24, and the rear end portions (kick panels 49) of the left and right pair of front side members 48 are respectively joined to the left and right pair of front side frames 24. The seat cross member 62 is provided at the vehicle rear side and obliquely upward of the power unit 30, and the seat cross member 62 spans in the vehicle width direction between the left and right pair front side members 48. The driving seat 66 of the vehicle 12 is supported by the seat cross member 62.

Moreover, in the present exemplary embodiment, the kick panels 25, 49 that slope downward on progression toward the rear side are respectively provided to the rear sections 24R of the left and right front side frames 24 and to the rear sections 48R of the left and right front side members 48. Thus, stress concentrates at the respective bend portions 25F, 25R, 49F, 49R of the kick panels 25, 49 in a head-on collision of the vehicle 12, such that the kick panels 25, 49 undergo deformation originating at these bend portions 25F, 25R, 49F, 49R. This deformation enables collision load to be absorbed.

As described above, in the present exemplary embodiment, the rear end portions (kick panels 49) of the left and right pair of front side members 48 are respectively joined to the left and right pair of front side frames 24, thereby enabling deformation at these kick panels 25, 49 to be stabilized.

Note that in the present exemplary embodiment, the reinforcement braces 72, 74 respectively span in the form of bracing between the left and right front side members 48 and the seat cross member 62. In the present exemplary embodiment, the front side members 48 and the seat cross member 62 are reinforced in this manner. Thus, in the present exemplary embodiment, in cases in which load toward the vehicle front side is input to the driving seat 66 due to inertia in a head-on collision of the vehicle 12, deformation of the seat cross member 62 that supports the driving seat 66 can be suppressed.

In the present exemplary embodiment, the seat cross member 62 is provided at the vehicle rear side and obliquely upward of the power unit 30, and so by suppressing deformation of the seat cross member 62, interference between the seat cross member 62 and the power unit 30 that would occur as a result of deformation of the seat cross member 62 can be suppressed. Thus, the present exemplary embodiment enables damage to the power unit 30 to be suppressed.

In the present exemplary embodiment, the power unit 30 is configured including the motor 32 that enables the vehicle 12 to travel and the control unit 34 that controls driving of the motor 32. The control unit 34 is disposed at the vehicle upper side of the motor 32. In the present exemplary embodiment, since deformation of the seat cross member 62 disposed at the vehicle rear side of the power unit 30 is suppressed in a head-on collision of the vehicle 12, at least load input to the control unit 34 due to deformation of the seat cross member 62 in a head-on collision of the vehicle 12 is reduced, thereby enabling damage to the control unit 34 to be suppressed.

Moreover, in the present exemplary embodiment, the driving seat 66 is provided on the right side of the vehicle 12. Namely, the driving seat 66 is disposed offset toward one vehicle width direction side with respect to the vehicle width direction center of the vehicle 12. Thus, in the present exemplary embodiment, in cases in which load toward the vehicle front side is input to the driving seat 66 due to inertia in a head-on collision of the vehicle 12, deformation of the seat cross member 62 that supports the driving seat 66 can be better suppressed than in a non-illustrated comparative example in which the driving seat 66 is disposed at the vehicle width direction center of the vehicle 12.

Furthermore, in the present exemplary embodiment, in cases in which load toward the vehicle rear side is applied to the front side members 48 in a head-on collision of the vehicle 12, some of the collision load input to the front side members 48 is transmitted to the seat cross member 62 through the reinforcement braces 72, 74, before being dispersed in the vehicle width direction along the seat cross member 62. Namely, some of the collision load input along the vehicle front-rear direction can be converted to load transmitted along the vehicle width direction.

Note that in the present exemplary embodiment, the joint 72A between the reinforcement brace 72 and the seat cross member 62 is disposed overlapping the driving seat 66 in a vehicle face-on view. Thus, in the present exemplary embodiment, in cases in which load toward the vehicle rear side is applied to the corresponding front side member 48 in a head-on collision of the vehicle 12, load toward the vehicle rear side acts on the driving seat 66 side through the joint 72A. Thus, in the present exemplary embodiment, some of the load toward the vehicle front side that acts on the driving seat 66 due to inertia in a head-on collision of the vehicle 12 can be cancelled out. This enables load toward the vehicle front side acting on the driving seat 66 to be reduced.

As described above, in the present exemplary embodiment, the reinforcement braces 72, 74 respectively span between the left and right front side members 48 and the seat cross member 62. This reinforces between the left and right front side members 48 and the seat cross member 62 such that deformation of the seat cross member 62 that supports the driving seat 66 is suppressed. However, as long as deformation of the seat cross member 62 can be suppressed, there is no limitation to this configuration.

For example, in the present exemplary embodiment, the driving seat 66 is provided on the right side of the vehicle 12. Thus, it is sufficient that the reinforcement brace 72 be provided at least on the right side of the vehicle 12, and despite rigidity being less than in cases in which there is reinforcement between the left and right front side members 48 and the seat cross member 62, both the reinforcement braces 72, 74 do not necessarily have to be provided.

Moreover, although the reinforcement braces 72, 74 are set with substantially the same length in the present exemplary embodiment, the reinforcement braces 72, 74 do not necessarily have to be the same length, depending on the position of the driving seat 66.

Modified Example of Present Exemplary Embodiment

Figure 3:
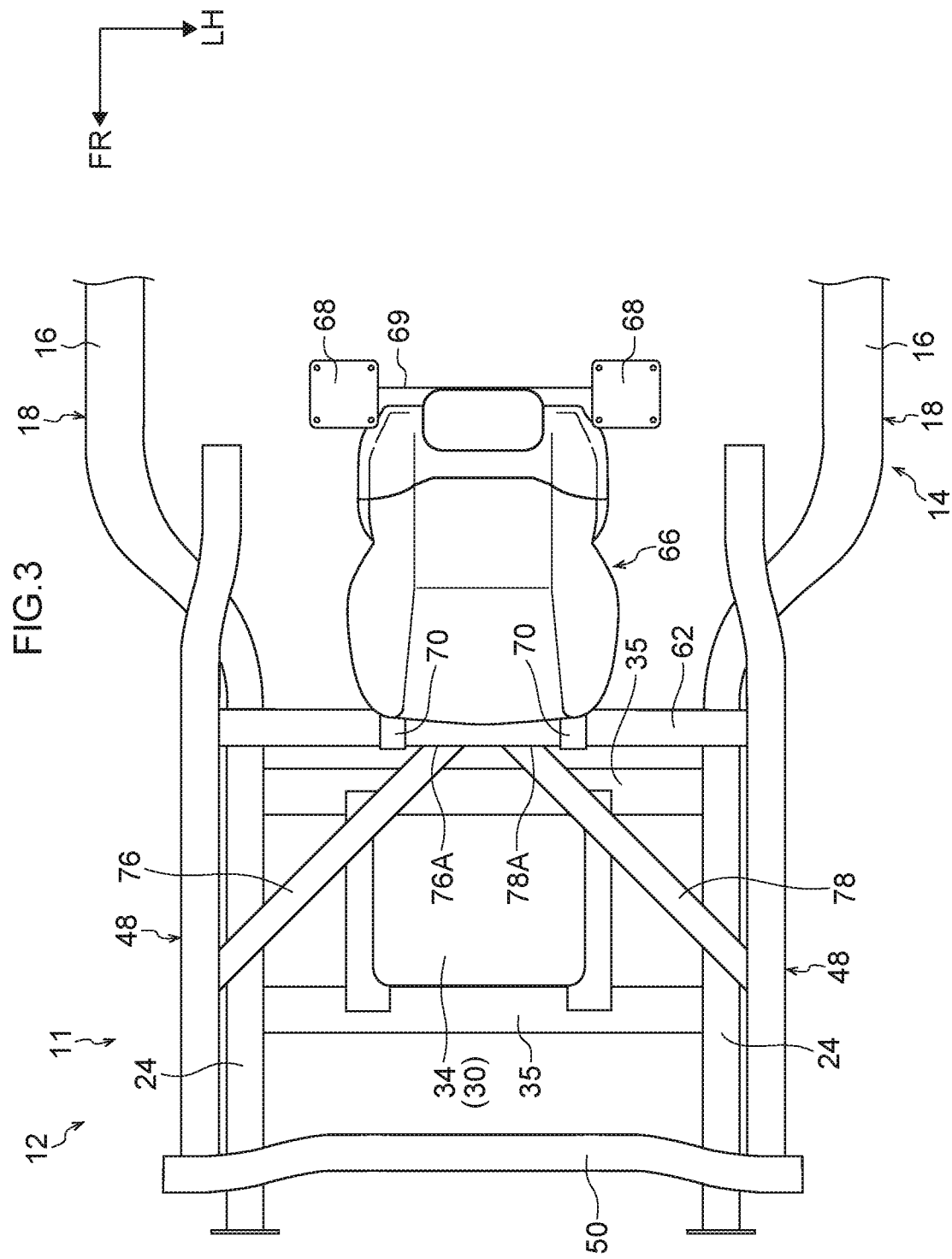
FIG. 3 is a cross-section corresponding to FIG. 2, illustrating a modified example of a front section of a vehicle applied with a vehicle front section structure according to an exemplary embodiment.

Although the driving seat 66 is provided on the right side of the vehicle 12 in the above exemplary embodiment as illustrated in FIG. 2, the driving seat 66 may be provided at a width direction central section of the vehicle 12 as illustrated in FIG. 3. In such cases, left and right reinforcement braces 76, 78 respectively span in the form of bracing between the left and right front side members 48 and the seat cross member 62.

Note that since joints 76A, 78A of the left and right reinforcement braces 76, 78 are set so as to be disposed overlapping the driving seat 66 in a vehicle face-on view, the reinforcement braces 76, 78 are formed longer than the reinforcement braces 72, 74 (see FIG. 2).

Thus, in the present modified example, the driving seat 66 is provided at the width direction central section of the vehicle 12, and the joints 76A, 78A of the left and right reinforcement braces 76, 78 are respectively set so as to be disposed overlapping the driving seat 66 in a vehicle face-on view.

Thus, a length direction central portion of the seat cross member 62 is better reinforced than in a non-illustrated comparative example in which the reinforcement braces 76, 78 span to both vehicle width direction end sides of the seat cross member 62, thereby enabling deformation of the seat cross member 62 to be further suppressed. Thus, even if load toward the vehicle front side is input to the driving seat 66 due to inertia in a head-on collision of the vehicle 12, deformation of the seat cross member 62 can be further suppressed.

Note that in the present modified example, the joints 76A, 78A of the left and right reinforcement braces 76, 78 are disposed overlapping the driving seat 66 in a vehicle face-on view. Thus, in the present modified example, load toward the vehicle rear side acts on the driving seat 66 through the joints 76A, 78A.

Thus, load toward the vehicle rear side acting on the driving seat is greater than in a non-illustrated comparative example in which only the joint 76A between the one reinforcement brace 76 and the seat cross member 62 is disposed overlapping the driving seat 66 in a vehicle face-on view. This enables some of the load toward the vehicle front side acting on the driving seat 66 due to inertia in a head-on collision of the vehicle 12 to be even more effectively cancelled out, enabling the load toward the vehicle front side acting on the driving seat 66 due to inertia to be further reduced.

Various other modifications may be implemented within a range not departing from the spirit of the present disclosure. Moreover, obviously the scope of rights of the present disclosure is not limited to the above exemplary embodiment.

What is claimed is:
1. A vehicle front section structure comprising:
   a power unit installed at a front section of a vehicle;
   a pair of front side frames extending in a vehicle front-rear direction at both vehicle width direction sides of the power unit so as to support the power unit, a front side portion of a rear section of each of the pair of front side frames includes a kick panel that slopes downward on progression rearward in the vehicle front-rear direction;
   a pair of front side members extending in the vehicle front-rear direction at a vehicle upper side of the pair of front side frames, with rear end portions of the front side members being respectively joined to the pair of front side frames, a rear section of each of the pair of front side members is provided with a kick panel that slopes downward on progression rearward in the vehicle front-rear direction;
   a cross member disposed at a vehicle rear side and obliquely upward of the power unit so as to span, in a vehicle width direction, between the pair of front side members and to support a driving seat of the vehicle; and
   a reinforcement brace spanning between the cross member and at least one front side member of the pair of front side members.

2. The vehicle front section structure of claim 1, wherein the power unit includes:
   a motor supported by the pair of front side frames and enabling the vehicle to travel; and
   a drive unit disposed at a vehicle upper side of the motor and controlling driving of the motor.

3. The vehicle front section structure of claim 1, wherein:
   the driving seat is disposed offset toward one vehicle width direction side with respect to a vehicle width direction center of the vehicle; and
   the reinforcement brace is disposed at least at the one vehicle width direction side, and a joint between the reinforcement brace and the cross member overlaps with the driving seat in a vehicle front view.

4. The vehicle front section structure of claim 1, wherein:
   a pair of reinforcement braces respectively span between the pair of front side members and the cross member; and
   respective joints between the pair of reinforcement braces and the cross member overlap with the driving seat in a vehicle front view.

5. The vehicle front section structure of claim 1, wherein the reinforcement brace overlaps with the power unit in the vehicle front-rear direction in a vehicle side view.

6. The vehicle front section structure of claim 1, further comprising a body that includes a floor panel having a sloped section that slopes downward on progression rearward in the vehicle front-rear direction.

7. The vehicle front section structure of claim 6, wherein the sloped section of the floor panel is spaced apart from an upper side of the pair of front side frames.

8. The vehicle front section structure of claim 1, wherein portions of the pair of front side members forward of the kick panels are disposed on an outer side of the pair of front side frames in the vehicle width direction.

9. The vehicle front section structure of claim 1, wherein portions of the front side members rearward of the kick panels are disposed in between the pair of front side frames in the vehicle width direction.

* * * * *